United States Patent Office 2,941,983

Patented June 21, 1960

2,941,983

URETHANE-TERMINATED POLYCARBODIIMIDES

Kenneth C. Smeltz, Wilmington, Del., assignor to E. I. du Pont de Nemours and Company, Wilmington, Del., a corporation of Delaware No Drawing. Filed May 7, 1957, Ser. No. 657,505

4 Claims. (Cl. 260—77.5)

This invention is directed to a new composition of matter which comprises urethane-terminated polycarbodiimides of controlled molecular weight. These compounds are useful in the preparation of films, coatings, fibers, elastomers, plastics, binders and adhesives.

Carbodiimides such as diphenylcarbodiimide are known. These compounds have been described in Chemical Reviews, vol. 53 (1953), pages 145–166, and in Chemistry of Carbon Compounds, vol. III–A, page 205, Elsevier Publishing Company (1954). In general, these carbodiimides have been prepared by treating a di-substituted thiourea with a metallic oxide, such as mercuric oxide. This type of process is not satisfactory for the preparation of polymeric compounds containing a plurality of carbodiimide linkages.

The polymeric carbodiimides prepared by treating diisocyanates with phospholine oxide catalysts exhibit limited storage stability. Their solutions soon become viscous and deposit gel polymer. Although the reasons for this instability are not fully understood it is believed that the terminal isocyanate groups are largely responsible. Chain extension involving these groups is possible in several different ways. Traces of the polymerization catalyst can promote further carbodiimide formation by interaction of the isocyanate groups with each other; traces of water can add to the carbodiimide links in the polymer and create sites for isocyanate attack. The presence of water may lead to urea links. Since these isocyanate-terminated polymeric carbodiimides have a tendency to undergo this uncontrolled chain extension, it is very difficult to isolate and keep a product of desired molecular weight.

It is, therefore, an object of the present invention to provide a novel class of polymeric carbodiimides which are urethane terminated.

It is also an object to provide polymeric carbodiimides of controlled molecular weight. It is a still further object of the present invention to provide polymeric carbodiimides whose solutions display improved shelf-life.

These and other objects will become apparent in the following description and claims.

More specifically, the present invention is directed to novel urethane-terminated polycarbodiimides of the formula

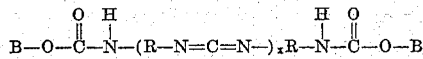

$$B-O-\overset{O}{\overset{\|}{C}}-\overset{H}{\overset{|}{N}}-(R-N=C=N-)_xR-\overset{H}{\overset{|}{N}}-\overset{O}{\overset{\|}{C}}-O-B$$

where R is a bivalent organic radical which is free of substituents reactive with isocyanate groups; B—O is a monovalent radical obtained by removing a hydrogen atom from a primary or secondary alcohol; B—O—H may not be phenolic and $x$ is an integer greater than 1.

The compounds of the present invention are made by dissolving a diisocyanate or an isocyanate-terminated linear polymer or their mixtures in a suitable inert solvent, initiating chain extension by adding a catalyst for carbodiimide formation, and, finally, chain-stopping the polymerization by introducing a primary or secondary alcohol when the polymer has reached a certain observed number average molecular weight.

The polymerization reaction may be carried out between about 25–150° C. The rate is inconveniently slow when the reaction temperature is below 25° C. When sterically unhindered diisocyanates such as methylene bis(4-phenylisocyanate) are polymerized, it is recommended that the upper temperature limit be about 100° C. When sterically hindered diisocyanates such as mesitylene diisocyanate are employed, the polymerization may be advantageously conducted at a temperature between about 100–150° C.

The alcohol added to the reaction mixture as a chain-terminator does not attack the carbodiimide linkage at temperatures below 100° C. Above 100° C. some addition may occur. Stieglitz and Lengfeld [Ber. 27, 926 (1894)] found that extensive addition of alcohols to the carbodiimide group occurred at 180° C. in an experiment carried out in a sealed tube.

The choice of a reaction temperature within the range 25–150° C. is governed by the solubility characteristics of the polycarbodiimide, the activity of the catalyst and the reactivity of the diisocyanate. The polymeric carbodiimide must not precipitate from solution during the reaction. A convenient rate of polymerization will require a higher temperature if less catalyst is used or if the catalyst is not very active or if a sterically hindered diisocyanate such as mesitylene diisocyanate is to be polymerized. It has been found convenient to carry out the operations at 50° C. when unhindered diisocyanates are employed.

Solutions containing about 10–30% by weight of diisocyanate are treated while agitated under anhydrous conditions with about 0.1–10 parts of catalyst for every 100 parts of diisocyanate. It has been found convenient to use about 0.6 part of 1-ethyl-3-methyl-3-phospholine 1-oxide. Carbon dioxide is evolved as chain extension occurs by carbodiimide formation.

The amount of the carbon dioxide given off during the reaction can be continually determined by passing the gas through a suitable absorption column which is attached to a balance. The weight of this carbon dioxide can be correlated with the progress of the polymerization by reference to a working plot of molecular weight attained vs. weight of carbon dioxide evolved for the diisocyanate in question. When the molecular weight has reached the level desired, alcohol is introduced into the reaction mixture. Shortly thereafter gas evolution ceases. The polymer may then be isolated.

The preferred procedure for obtaining the polymeric carbodiimides is to remove the solvent under vacuum. This procedure avoids fractionation. When the polymeric carbodiimide is prepared in benzene, it may be isolated by pouring the solution into a large excess of an aliphatic hydrocarbon solvent such as n-hexane. This method of isolation, however, does not recover all the polymer.

The number average molecular weight of the products isolated has been determined by ebullioscopic measurements or by titration of a polyguanidine derivative. The values obtained are in excellent agreement with the molecular weights indicated by carbon dioxide evolution. In Example 1A, the polymer number-average molecular weight is given as 670 by gas evolution, 680 by boiling point rise, and 664 by titration of the polyguanidine.

Primary or secondary amines may be used as well as their alcohol analogues to stop the growing polymer chains; however, unlike the alcohols under these temperature conditions, the amines also add to the carbodiimide linkages to form guanidines.

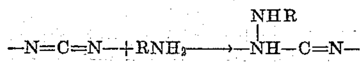

This addition does afford a convenient way for determining the —N=C=N— content of the polymer and the molecular weight. The polymer is treated with excess ethylamine, the unreacted amine is boiled off, and the guanidine is titrated with standard acid.

The carbodiimides of the present case are usually solids whose physical properties depend on the nature of the diisocyanate employed and the degree of polymerization. The infrared spectra of these carbodiimides exhibit bands characteristic of the NH group at 3.02 microns, the —N=C=N— group at 4.70 microns and a urethane carbonyl group at 5.77 microns.

Primary or secondary alcohols containing no other substituents reactive with isocyanates are useful in this invention. Representative examples of these alcohols are methyl alcohol, ethyl alcohol, isopropyl alcohol, sec.-butyl alcohol, isoamyl alcohol, n-hexanol, cyclohexanol, 2-chloro-1-propanol, 2-octanol, methyl phenyl carbinol, benzyl alcohol, diethylene glycol mono-n-butyl ether, and cinnamyl alcohol. Tertiary alcohols and phenols, cresols, naphthols, and other compounds in which the hydroxyl group is directly attached to an aromatic ring are not suitable. For optimum results, the alcohol selected to stop the polymerization should have a boiling point above the temperature at which the reaction is being conducted.

The bivalent organic radical R usually represents an arylene residue obtained by removing the isocyanate groups from an arylene diisocyanate. R must be free of substituents reactive with isocyanate groups. Representative examples of arylene diisocyanates operable in this invention are: toluene-2,4-diisocyanate, toluene-2,6-diisocyanate, naphthalene-1,5-diisocyanate, m-phenylenediisocyanate, 4,4'-diisocyanatobiphenyl, 4,4'-diisocyanatodiphenylmethane, 3,3'-dimethyl-4,4'-diisocyanatodiphenylmethane, 4,4'-diisocyanatodiphenylmethane, 3,3'-dichloro-4,4'-diisocyanatodiphenylmethane, 3,3'-dimethoxy-4,4'-diisocyanatodiphenylmethane, 2,4-diisocyanatochlorobenzene, 4,4'-diisocyanatodiphenylether, cumene-2,4-diisocyanate and mesitylene-diisocyanate. R may also represent the following residue.

$$-ArNH-\overset{O}{\overset{\|}{C}}-\left[O-G-O-\overset{O}{\overset{\|}{C}}-NH-Ar-NH-\overset{O}{\overset{\|}{C}}-\right]_x O-G-O-\overset{O}{\overset{\|}{C}}-NH-Ar-$$

obtained by removing the terminal isocyanate groups from an isocyanate-terminated linear polyurethane. The O—G—O represents the residue obtained by removing the terminal hydrogen atoms from polyalkyleneether glycols of the form $H(OR)_nOH$ (where R need not be the same throughout the polymer chain and $n$ is an integer indicating a molecular weight as high as 10,000) or hydroxyl-terminated polyesters or hydroxyl-terminated polyhydrocarbons. Representative examples of the hydroxyl-terminated compounds suitable are: polytetramethyleneether glycol (M.W.=3,000), polypropyleneether glycol (M.W.=1025), polyhexamethyleneether glycol (M.W.=6,000), polydecamethyleneether glycol (M.W.=8,500), polytetramethyleneformal glycol, ethylene oxide modified polypropyleneether glycol (commercially available from Wyandotte Chemicals Corp. as "Pluronic" L-61), $\alpha,\omega$-polyisoprenediol (M.W.=2,000). Mixtures of these polymers, mixtures of diisocyanates, and mixtures of polymers and diisocyanates may be employed.

The catalysts which are useful in preparing the polymers of the present invention include phospholines, phospholine oxides and sulfides, phospholidines and phospholidine oxides and sulfides. The phospholine oxides and sulfides are described in U.S. Patents 2,663,737 and 2,663,738. The phospholidine oxides are described in U.S. Patent 2,663,739. The corresponding phospholines and phospholidines may be prepared by a lithium aluminum hydride reduction of the corresponding dichlorophospholine or phospholidine. These dichloro compounds are also used to prepare the above-mentioned oxides and sulfides and are described in U.S. Patent 2,663,736. Representative examples of suitable catalysts are 1-ethyl-3-phospholine, 1-ethyl-3-methyl-3-phospholine-1-oxide, 1-ethyl-3-methyl-3-phospholine 1-sulfide, 1-ethyl-3-methyl-phospholidine, 1-ethyl-3-methyl-phospholidine 1-oxide. The preferred catalyst is 1-ethyl-3-methyl-3-phospholine 1-oxide. The particular amount of catalyst used will depend to a large extent on the reactivity of the catalyst itself and the organic polyisocyanate being used. A concentration range of 0.1–10 parts of catalyst per 100 parts of organic diisocyanate is suitable. About 0.5–1.0 part of the preferred catalyst is satisfactory when diisocyanates such as toluenediisocyanate are being polymerized.

The solvent must contain no groups reactive with isocyanates or alcohols under the conditions of the polymerization. In general, solvents should be avoided which contain active hydrogen atoms as determined by the Zerewitinoff [J. Am. Chem. Soc. 49, 3181 (1927)] procedure. The solvent should readily dissolve both the diisocyanate and the alcohol used as the chain-stopper. Furthermore, it should maintain the polymeric carbodiimide in solution during the polymerization. Benzene, toluene, the xylenes, ethyl benzene, isopropyl benzene, mesitylene, cyclopentane, n-hexane, cyclohexane, n-heptane, methyl cyclohexane, tetramethylethylene, diisobutylene, chlorobenzene, methylene chloride, ethylidene chloride, chloroform, carbon tetrachloride, ethylene chloride, methylene bromide, o-dichlorobenzene, chloromethylether, isopropylether, dioxane, tetrahydrofuran, and pyridine are representative examples of solvents useful in this invention.

The —N=C=N— content is determined as follows: Weigh a 0.2 g. sample of the polycarbodiimide into a 250-ml. Erlenmeyer flask. Introduce 35–50 ml. of dry tetrahydrofuran and dissolve the sample. Add about 5.0 ml. of a 0.4 M solution of ethylamine in tetrahydrofuran. Stopper the Erlenmeyer flask and allow it to stand 15–30 minutes at room temperature. Remove the stopper, add a boiling chip, and heat the flask on a steam bath. Bring the solution to boil and maintain boiling until the vapor is no longer basic to wet indicator paper. Cool the solution, add about 8 drops Brom Phenol Blue indicator and titrate with 0.1 N hydrochloric acid until the solution turns green.

For example, a 0.2078 g. sample requires 9.15 ml. of 0.1005 N hydrochloric acid. The percent N=C=N present is $$\frac{9.15\times 0.1005\times 40\times 100}{0.2078\times 1000}=17.7\%$$

In general, $$\text{Percent } N=C=N=\frac{\text{milliliters acid}\times\text{normality of HCl}\times 4}{\text{grams of sample}}$$

The number-average molecular weight of a polycarbodiimide may be obtained from the percent N=C=N. When the polymer structure is $$RO-\overset{O}{\overset{\|}{C}}-NH[Ar-N=C=N-]_nAr-NH-\overset{O}{\overset{\|}{C}}-OR$$

(where R—O is a radical obtained by removing a hydrogen atom from an alcohol ROH and Ar is a divalent arylene radical obtained by removing both NCO groups from an arylene diisocyanate $Ar(NCO)_2$), the number-average molecular weight $\overline{Mn}$ is equal to $$\overline{Mn}=2[\text{mol. wt. ROH}]+n[\text{mol. wt. }(Ar-N=C=N)]+\text{mol. wt. }Ar(NCO)_2$$

The percent N=C=N may be defined as $$\text{Percent } N=C=N=\frac{40n\times 100}{Mn}$$

$\overline{Mn}$ may be calculated by using the following expression (which may be derived by appropriate substitutions)

$$\overline{Mn} = \text{mol. wt. Ar—N=C=N}\left[\frac{2\text{ mol. wt. ROH}+\text{mol. wt. Ar(NCO)}_2}{\frac{4000}{\text{Percent N=C=N}}-\text{mol. wt. ArN=C=N}}\right]+\text{mol. wt. Ar(NCO)}_2+2\text{ mol. wt. ROH}$$

Representative examples illustrating the present invention follow.

*Example 1A*

Preparation of

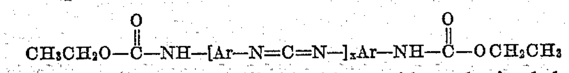

where Ar represents the bivalent residue obtained by removing the isocyanate groups from toluene-2,4-diisocyanate.

0.2 part of 3-methyl-1-ethyl-3-phospholine 1-oxide is added with stirring to a solution of 34.8 parts (0.2 mole) of toluene-2,4-diisocyanate in 175 parts of anhydrous benzene at 50° C. Carbon dioxide evolution starts at once and continues steadily in the following 37 minutes during which the reaction mixture is agitated at 50° C. A total of 6.0 parts of carbon dioxide is collected. Then 9.2 parts (0.2 mole) of absolute ethanol are added. Gas is evolved for 23 more minutes. The total carbon dioxide collected amounts to 6.7 parts.

The solution is concentrated under reduced pressure at a temperature below 50° C. The sticky mass obtained is soluble in chloroform and benzene. Its infrared spectrum shows a NH band at 3.02 microns, a —N=C=N— band at 4.70 microns, and a urethane carbonyl band at 5.77 microns. Analysis of the polycarbodiimide gives an 18.4% —N=C=N content which indicates a number-average molecular weight of 664. The total weight of carbon dioxide evolved indicates a number-average molecular weight of 670. The ebullioscopic value determined in benzene is 680.

*Example 1B*

The procedure in Example 1A is repeated except that the ethanol is not added until 8.2 parts of carbon dioxide have been evolved (270 minutes after initiation of reaction). No more gas is given off. About two-thirds of the benzene is removed and the concentrated solution is poured into n-hexane. The white fluffy precipitate which separates is only partially soluble in chloroform, benzene and tetrahydrofuran. The infrared spectrum of a film cast from the chloroform solution exhibits a NH peak at 3.10 microns, a strong —N=C=N— band at 4.68 microns, and a small urethane carbonyl band at 5.76 microns. The number-average molecular weight of the unfractionated product is indicated to be 2114 by the weight of carbon dioxide collected during the run.

*Example 2A*

Preparation of

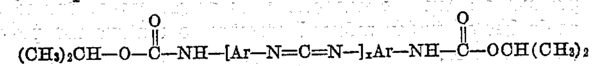

where Ar represents the bivalent residue obtained by removing the isocyanate groups from toluene-2,4-diisocyanate.

0.2 part of 3-methyl-3-phospholine-1-oxide is added with agitation to a solution of 34.8 parts (0.2 mole) of toluene-2,4-diisocyanate in 175 parts of anhydrous benzene at 50° C. The mixture obtained is maintained at 50° C. and continually agitated. Carbon dioxide evolution occurs steadily and 6.0 parts are collected within 50 minutes. Then 12 parts (0.2 mole) of isopropanol is introduced. Gas continues to be evolved for about 25 minutes until the total collected is 7.0 parts. Thereafter no more is given off.

The benzene is distilled off at reduced pressure and at a temperature below 50° C. The hard brittle product is soluble in chloroform and benzene.

The infrared spectrum of a Nujol mull exhibits an NH band at 3.03 microns, a —N=C=N— band at 4.74 microns, and a urethane carbonyl band at about 5.83 micons. Analysis indicates that the polymer has a 19.5% —N=C=N— content which implies a number-average molecular weight of 803. The 7.0 parts of carbon dioxide given off during the polymerization indicate a number-average molecular weight of 794. The ebullioscopic value determined in benzene is 792.

*Example 2B*

The procedure of Example 2A is repeated except that the isopropanol is not added until 7.5 parts carbon dioxide have been evolved (2 hours reaction time). Gas is given off for about 19 minutes to yield a total of 7.8 parts. The benzene is then distilled off under reduced pressure at a temperature below 50° C. The hard brittle product obtained is soluble in benzene and chloroform. The infrared spectrum of a film cast from a chloroform solution indicates the bands for the NH—, the —N=C=N—, and the C=O groups listed in Example 2A.

*Example 3*

Preparation of

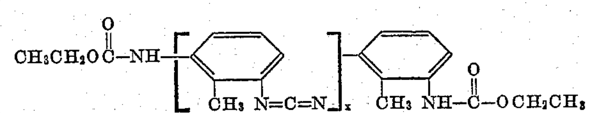

0.2 part of 3-methyl-1-ethyl-3-phospholine 1-oxide is added with stirring to a solution of 34.8 parts (0.2 mole) of toluene-2,6-diisocyanate in 175 parts of anhydrous benzene at 50° C. Carbon dioxide evolution begins at once and continues steadily in a first-order manner during the following 1 hour and 40 minutes during which the reaction mixture is agitated at 50° C. When 6.3 parts of carbon dioxide have been evolved, 9.2 parts (0.2 mole) of absolute ethanol is added. Gas is given off for a short while. The total carbon dioxide collected is 6.6 parts.

The mixture is cooled and poured into a large excess of n-hexane with stirring. The precipitated solid is filtered, dissolved in hot chloroform and again precipitated by addition to n-hexane. The total weight of carbon dioxide evolved indicates a number-average molecular weight of 642.

*Example 4A*

Preparation of

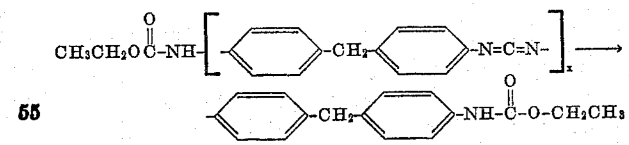

in benzene.

0.2 part of 3-methyl-1-ethyl-3-phospholine 1-oxide is added with stirring to a solution of 50 parts (0.2 mole) of 4,4'-diisocyanato diphenylmethane in 175 parts of anhydrous benzene at 50° C. Carbon dioxide evolution begins at once and continues steadily in a first-order manner in the following hour during which the reaction mixture is agitated at 50° C. In the first hour 7.9 parts of carbon dioxide is given off. Then 9.2 parts (0.2 mole) of absolute ethanol is added. Carbon dioxide evolution stops after 15 minutes. The total gas collected weighs 8.1 parts.

The solution is concentrated at 40–50° C. under vacuum to give a white solid which analyzes for 17.0% carbodiimide content. This indicates a number-average molecular weight of 2771. The total weight of carbon dioxide evolved indicates a number-average molecular weight of 2750.

*Example 4B*

The procedure in Example 4A is repeated except that the ethanol is introduced when only 6.9 parts of carbon dioxide have been evolved. The number-average molecular weight is about 1071 at this point. Gas evolution ceases after 0.4 additional part has been collected. The solution is cooled and poured with stirring into n-hexane. The product separates as a white solid. The weight of carbon dioxide collected indicates a number-average molecular weight of 1332.

*Example 5*

Preparation of

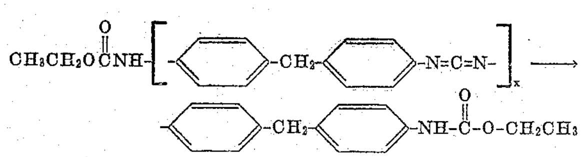

in chloroform.

0.2 part of 3-methyl-1-ethyl-3-phospholine 1-oxide is introduced with agitation into a solution of 50 parts (0.2 mole) of 4,4'-diisocyanatodiphenylmethane in 300 parts of chloroform at 50° C. The mixture obtained is subsequently stirred at 50° C. Carbon dioxide evolution is very slow and only 4.8 parts is collected in the first 3 hours. An additional 0.2 part of cyclic phospholine catalyst is introduced. The reaction is continued at 50° C. for 2 hours and 20 minutes longer. The total carbon dioxide collected is 6.2 parts. Then 9.2 parts (0.2 mole) of absolute ethanol is introduced. Carbon dioxide evolution ceases after about 20 minutes during which about 0.2 part is collected.

The solution is concentrated under vacuum at a temperature below 50° C. until about half the chloroform has been removed. The residual solution is poured into n-hexane with stirring. The precipitated polymer product is separated and air-dried.

*Example 6*

Preparation of

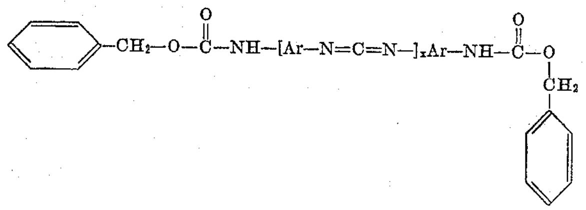

0.2 part of 3-methyl-1-ethyl-3-phospholine 1-oxide is added with stirring to a solution of 34.8 parts (0.2 mole) toluene-2,4-diisocyanate in 175 parts of anhydrous benzene at 50° C. Carbon dioxide evolution begins at once and continues steadily in the succeeding hour during which the reaction mixture is stirred at 50° C. Six parts of carbon dioxide is collected.

Then 15.6 parts (0.144 mole) of benzyl alcohol are introduced. Gas evolution stops after an additional 70 minutes during which 0.9 part of carbon dioxide is collected.

Half the benzene is distilled off under reduced pressure at a temperature below 50° C. The concentrated solution is poured into a large volume of n-hexane. The polymeric product precipitated is separated and washed with additional n-hexane. The polycarbodiimide is a white fluffy solid which dissolves in benzene and chloroform. The infrared spectrum of a film cast from chloroform solution exhibits —NH band at 3.0 microns, a strong N=C=N peak at 4.70 microns, and a urethane carbonyl band at 5.76 microns.

*Example 7*

Preparation of

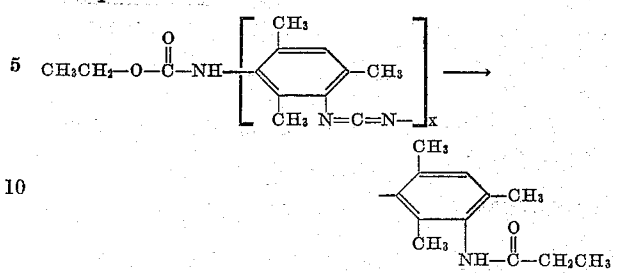

0.2 part of 3-methyl-1-ethyl-3-phospholine 1-oxide is added with stirring to a solution of 40.4 parts (0.2 mole) of mesitylene diisocyanate in 260 parts of o-dichlorobenzene at 140° C. Carbon dioxide evolution begins at once and continues steadily in a first-order manner for the following 3 hours and 40 minutes during which the reaction mixture is agitated at 140° C. When 8.6 parts of carbon dioxide has been evolved, external cooling is applied and the temperature of the reaction mixture is lowered to 70° C. Then 9.2 parts (0.2 mole) of absolute ethanol is introduced. No more carbon dioxide is evolved thereafter. A storage stable solution of urethane-terminated polymeric carbodiimide is obtained. The weight of carbon dioxide collected during the run indicates that the polymer has a number-average molecular weight of 7250.

*Example 8*

Preparation of

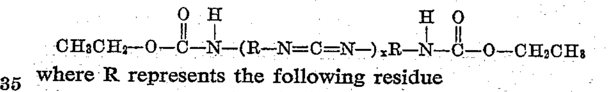

where R represents the following residue

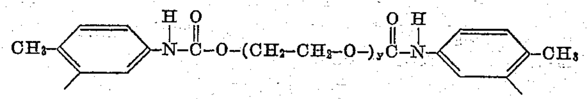

obtained by removing the terminal isocyanate groups from toluene-2,4-diisocyanate capped polyethyleneether glycol.

A. PREPARATION OF ISOCYANATE-TERMINATED POLYETHYLENEETHER 310 parts (0.5 mole) of polyethyleneether glycol (M.W.=620; water content=0.04%) and 0.88 part (0.005 mole) of benzene sulfonyl chloride are thoroughly mixed and added at room temperature to 522 parts (3.0 moles) of toluene-2,4-diisocyanate contained in a dry reaction vessel equipped with a thermometer, agitator, nitrogen inlet and a condenser attached to a drying tube. A slow sweep of dry nitrogen is continually maintained. External heat is applied and the temperature of the reaction mixture is adjusted to 75° C. The reactants are agitated for one hour at 75° C. The excess toluene diisocyanate is distilled off under reduced pressure. The product obtained is extracted with petroleum ether and again heated under reduced pressure to remove the petroleum ether.

*Analysis.*—Calcd.: percent free NCO, 8.7. Found: percent free NCO, 9.1.

B. PREPARATION OF THE POLYCARBODIIMIDE 0.5 part of 3-methyl-1-ethyl-3-phospholine 1-oxide is added with stirring to a solution of 85.4 parts (0.0882 mole) of the isocyanate-terminated polyethyleneether in 214.6 parts of anhydrous acetone at about 25° C. The mixture is agitated at about 25° C. under a nitrogen atmosphere for 28.5 hours. During this period a total of 3.15 parts (0.075 mole) of carbon dioxide is slowly evolved. 15.8 parts (0.34 mole) ethylalcohol is then added; an additional 0.20 part (0.0046 mole) is collected during the succeeding 23 hours before gas evolution stops. The acetone is then distilled off. The product obtained is a rubbery amber-colored solid which is nearly completely soluble in acetone and tetrahydrofuran. Its number-average molecular weight is about 6680 (based on the weight of carbon dioxide collected during the run).

C. APPLICATION AS AN ANTI-STATIC AGENT

A 3% (by weight) solution is prepared by dissolving 6 parts of the polycarbodiimide in 180 parts of tetrahydrofuran and 14 parts of water. This solution was padded onto fabric made from "Dacron" polyester fiber and cured for 5 minutes at 150° C. Antistatic protection is imparted to the fabric.

The polycarbodiimides of the present invention may be formed into numerous shaped articles such as fibers, films, sheets, etc. These polymers may be molded, pressed and extruded. They possess desirable adhesive properties; also, antistatic properties may be imparted to base materials when utilizing the present polymers. Solvent solutions thereof may be used for coating surfaces and to form supported or unsupported films. The polymers of the present invention may be compounded with various agents such as carbon black, clay, silica, talc, zinc and magnesium oxides, calcium and magnesium carbonate, titanium dioxide, and plasticizers.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Urethane-terminated polycarbodiimides having the formula

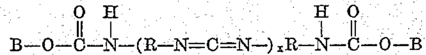

wherein R is a bivalent organic radical, non-reactive with isocyanate groups, taken from the group consisting of an arylene bivalent radical and the bivalent radical obtained by removing the terminal isocyanate groups from a linear polyalkyleneether polyurethane; B—O— is a monovalent radical obtained by removing the hydroxyl hydrogen atom from an alcohol taken from the group consisting of primary and secondary alcohols containing no other substituents reactive with isocyanates, and $x$ is an integer greater than 1.

2. A urethane-terminated polycarbodiimide of the formula

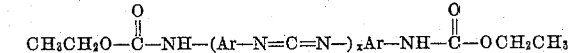

where Ar is the bivalent radical obtained by removing both isocyanate groups from toluene-2,4-diisocyanate, wherein $x$ in the formula is an integer greater than 1.

3. A urethane-terminated polycarbodiimide of the formula

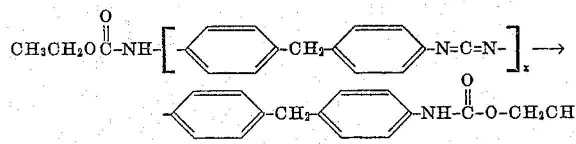

wherein $x$ in the formula is an integer greater than 1.

4. A urethane-terminated polycarbodiimide of the formula

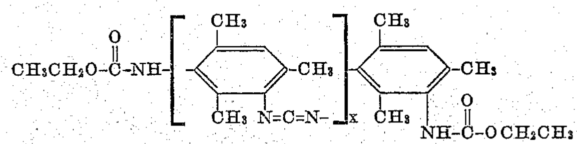

wherein $x$ in the formula is an integer greater than 1.

References Cited in the file of this patent

UNITED STATES PATENTS

| | | |
|---|---|---|
| 2,729,618 | Muller et al. | Jan. 3, 1956 |
| 2,853,473 | Campbell et al. | Sept. 23, 1958 |

OTHER REFERENCES

Serial No. 397,741, A.P.C. (Schlack), published April 20, 1943.